(12) United States Patent
Lewis

(10) Patent No.: US 6,546,506 B1
(45) Date of Patent: Apr. 8, 2003

(54) TECHNIQUE FOR AUTOMATICALLY GENERATING A SOFTWARE TEST PLAN

(75) Inventor: Erika B. Lewis, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/394,361

(22) Filed: Sep. 10, 1999

(51) Int. Cl.[7] .......................... G06F 15/00; G06F 17/60
(52) U.S. Cl. .......................... 714/38; 717/101; 717/124
(58) Field of Search .............................. 714/38, 37, 25; 709/100, 102, 103; 705/7, 8, 9; 701/1; 700/99, 100, 97, 95, 90; 717/101, 124

(56) References Cited

U.S. PATENT DOCUMENTS

| | | | | |
|---|---|---|---|---|
| 5,111,391 A | * | 5/1992 | Fields et al. .................. | 705/9 |
| 5,446,895 A | * | 8/1995 | White et al. ................ | 717/101 |
| 6,073,107 A | * | 6/2000 | Minkiewicz et al. .......... | 705/7 |
| 6,088,678 A | * | 7/2000 | Shannon ....................... | 705/8 |

OTHER PUBLICATIONS

Qing Hu "Evaluating Alternative Software Production Functions", IEEE Transactions on Software Engineering, vol. 23 No. 6, Jun. 1997, pp. 379–387.*

Mukhopadhyay and Keker, "Software Effort Models for Early Estimation of Process Control Applications", IEEE Transactions on Software Engineering, vol. 18 No. 10, Oct. 1992, pp. 915–924.*

Jim E. Helm "The Viability of Using Cocomo in the Special Application Software Bidding and Estimating Process", IEEE Transactions on Engineering Management, vol. 39 No. 1, Feb. 1992, pp. 42–58.*

* cited by examiner

Primary Examiner—Robert Beausoliel
Assistant Examiner—Christopher R. McGrath
(74) Attorney, Agent, or Firm—Jeanine S. Ray-Yarletts; Marcia L. Doubet

(57) ABSTRACT

A method, system, and computer program product for automatically generating a software test plan. The computation of test duration is based on tasks performed by test personnel, in particular the tasks of executing test scenarios and identifying (and documenting) defects, the number of hours spent on these tasks, and the number of test personnel available.

15 Claims, 2 Drawing Sheets

TECHNIQUE FOR AUTOMATICALLY GENERATING A SOFTWARE TEST PLAN

BACKGROUND OF THE INVENTION

1. Field of the Invention

The present invention relates to computer software testing, and deals more particularly with a method, system, and computer program product for automatically generating a software test plan. The computation of test duration is based on the number of hours spent executing test scenarios and identifying defects, and the number of test personnel available.

2. Description of the Related Art

Software development occurs in stages, from designing a solution to an identified problem or need, to writing code to implement the solution, to testing the code. Planning the cost and duration of each of these stages is critical in determining the business case for proceeding with the software development. The duration information is also critical for properly planning the date of availability of the software.

Testing is an important part of the software development cycle. The motivation for testing software is to raise the quality and reliability of the program, and to establish confidence that the program does what it is supposed to do. Assuming that programs contain errors, the purpose of testing is to find as many of the errors as possible. Thus, testing may be considered as the process of executing a program with the intent of finding errors.

Planning the duration of the test phase is an especially important part of planning for a software development project, since this phase comes immediately before product shipment or availability to the market. Often, the duration of a test in a test plan is computed by assuming that testing should account for some fixed percentage of the total development cycle. While this approach has the advantage of simplicity, it has a number of drawbacks. First, if the overall estimate of duration of the development cycle is inaccurate, the duration of the test phase will only be accurate by happenstance. Second, this approach ignores the number of test personnel who are available and their experience levels. Obviously, if an insufficient number of testers are available, or those who are available are inexperienced, it is less likely that the testing will be completed during the fixed-percentage timeframe than if the test phase has been staffed with a sufficient number of experienced testers.

Another approach to computing test phase duration is to ask the assigned testers working on the project to estimate how much time each will need to complete the testing of his or her portion of the code, and then totaling those estimates. This approach also has a number of drawbacks. It assumes that all the testers have been assigned early enough in the development cycle to provide estimates in a timely manner, and that these testers have the experience and a sufficient understanding of their assigned code to make good estimates. Often with software projects, plans for the overall development cycle are put in place before all the testers are available and assigned, since test is a later phase of the software development process. In addition, test personnel may be recently hired employees or subcontracted temporary employees, since the test phase deals often with exercising the product using the external interface and thus can be a good place to train people who are unfamiliar with the product. Because of these factors, relying on the testers' "best guesses" as to test phase duration is unlikely to be accurate, and will lead to a plan that ends up being unachievable.

Yet another approach to computing test phase duration is to estimate the number of lines of code under development, often expressed in terms of "KLOC" (i.e. thousands of lines of code).

However, in addition to being affected by several of the factors previously discussed (such as ignoring tester availability and experience), this approach typically does not account for such factors as inaccurate estimates in the overall number of KLOC, whether the code being tested is complex or relatively simple, whether the code to be tested is completely new or is existing code that has been modified, etc.

Accordingly, what is needed is an improved technique for estimating test phase duration for generating an associated test plan.

SUMMARY OF THE INVENTION

An object of the present invention is to provide an improved technique for estimating test phase duration.

Another object of the present invention is to provide this technique by defining a computational model based upon the tasks performed by test personnel.

Yet another object of the present invention is to provide this technique by defining a computational model based upon the time spent executing test scenarios or test cases and documenting discovered defects, and the number of testers available.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer program product for estimating test phase duration. This technique comprises: obtaining productivity information for a software project to be tested, this productivity information comprising an average number of hours required for executing a test scenario, an average number of hours required for identifying and documenting a defect, and a productivity factor of test personnel; obtaining input values for the software project, these input values comprising a projected number test scenarios, a projected number of defects, and a projected number of test personnel; computing a number of weekly hours available for work; and generating the software test plan using the obtained productivity information and the obtained input values. Generating the test plan further comprises: computing a duration of the testing of the software project when the duration is not known; and computing a risk factor for the testing when the duration is known.

Computing the number of weekly hours available for work preferably further comprises: computing a number of hours available per week per tester by multiplying a number of hours per work week by the productivity factor; computing a diminishing return value by multiplying 10 by a result of subtracting $Y^x$ from 1.0, where Y is a diminishing return productivity factor and x is the projected number of test personnel; and setting the number of weekly hours available for work to a product of the computed number of hours available per week multiplied by the computed diminishing return value. Preferably, the diminishing return productivity factor is 0.9.

Computing a duration further preferably comprises: computing a total of hours needed for test scenario execution by multiplying the average number of hours required for executing a test scenario by the projected number of test scenarios; computing a total of hours needed for defect identification and documentation by multiplying the average number of hours required for identifying and documenting a defect by the projected number of defects; computing a total hours needed by adding the computed total of hours needed for test scenario execution and the total of hours needed for defect identification and documentation; and computing the duration in weeks by dividing the computed total hours needed by the number of weekly hours available for work.

Computing a risk factor preferably further comprises: computing a capacity for defects, and computing a risk. Computing a capacity for defects may further comprises: computing a first product by multiplying the known duration by the number of weekly hours available for work; computing a second product by multiplying the average number of hours required for executing a test scenario by the projected number of test scenarios; computing a time available for defects by subtracting the second product from the first product; and setting the capacity for defects to the computed time available for defects divided by said the average number of hours required for identifying and documenting a defect. Computing the risk may further comprise: subtracting the capacity for defects from the projected number of defects; and setting the risk factor to the computed risk.

The present invention will now be described with reference to the following drawings, in which like reference numbers denote the same element throughout.

DESCRIPTION OF THE PREFERRED EMBODIMENT

Figure 1:
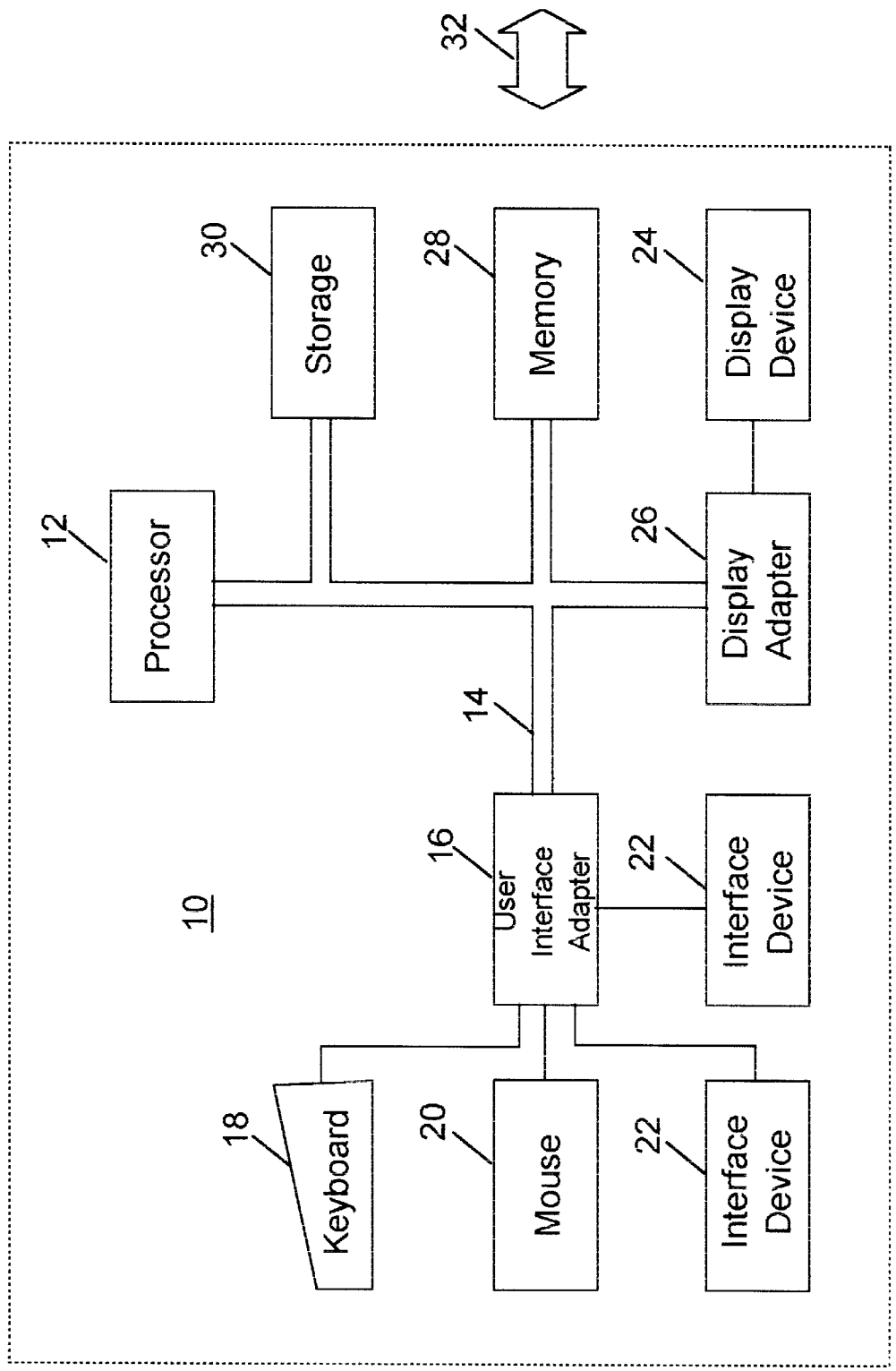
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

In the preferred embodiment, the present invention is implemented as a computer software program. The program code of the preferred embodiment may be implemented as objects (classes and methods) in an object-oriented programming language such as Smalltalk, or as instructions in a conventional procedural programming language (such as the C programming language).

The software test plan generation technique of the present invention defines a model for computing test duration. This model takes into account the tasks most commonly performed by test personnel and the number of test personnel available. In particular, the computation is based on the tasks of (i) executing test scenarios (which may also be referred to as "test cases") and (ii) identifying and documenting defects, and the number of hours spent in each of these tasks. By dividing the software testing project into the smaller tasks of test scenario execution and documentation of discovered defects, it is easier and quicker to approximate the test phase duration as compared to the prior art techniques which have been described. The time required to execute one test case "cleanly" (that is, without discovery of any defects and the associated documentation time that would be required for such defects) is easier to estimate than to estimate the time required for testing an entire software product, or even for testing a subdivision of the product such as a particular function. Similarly, the time required to document a discovered defect is relatively easy to estimate. Taking these estimates of small, specific tasks and multiplying them by the number of times the tasks will be repeated (i.e. by the number of test cases to be executed and the projected number of defects to be found) provides a good estimate of the total amount of work to be done. This estimate of the work to be done, combined with information about how many testers are available, can be used to generate an estimate of the test duration.

The model of the present invention is based upon the following formula:

$$\text{weeks\_of\_duration} = (\text{time\_for\_test\_scenarios} + \text{time\_for\_defects}) / (\text{tester\_hours\_per\_week} * \text{productivity\_factor})$$

Figure 2:
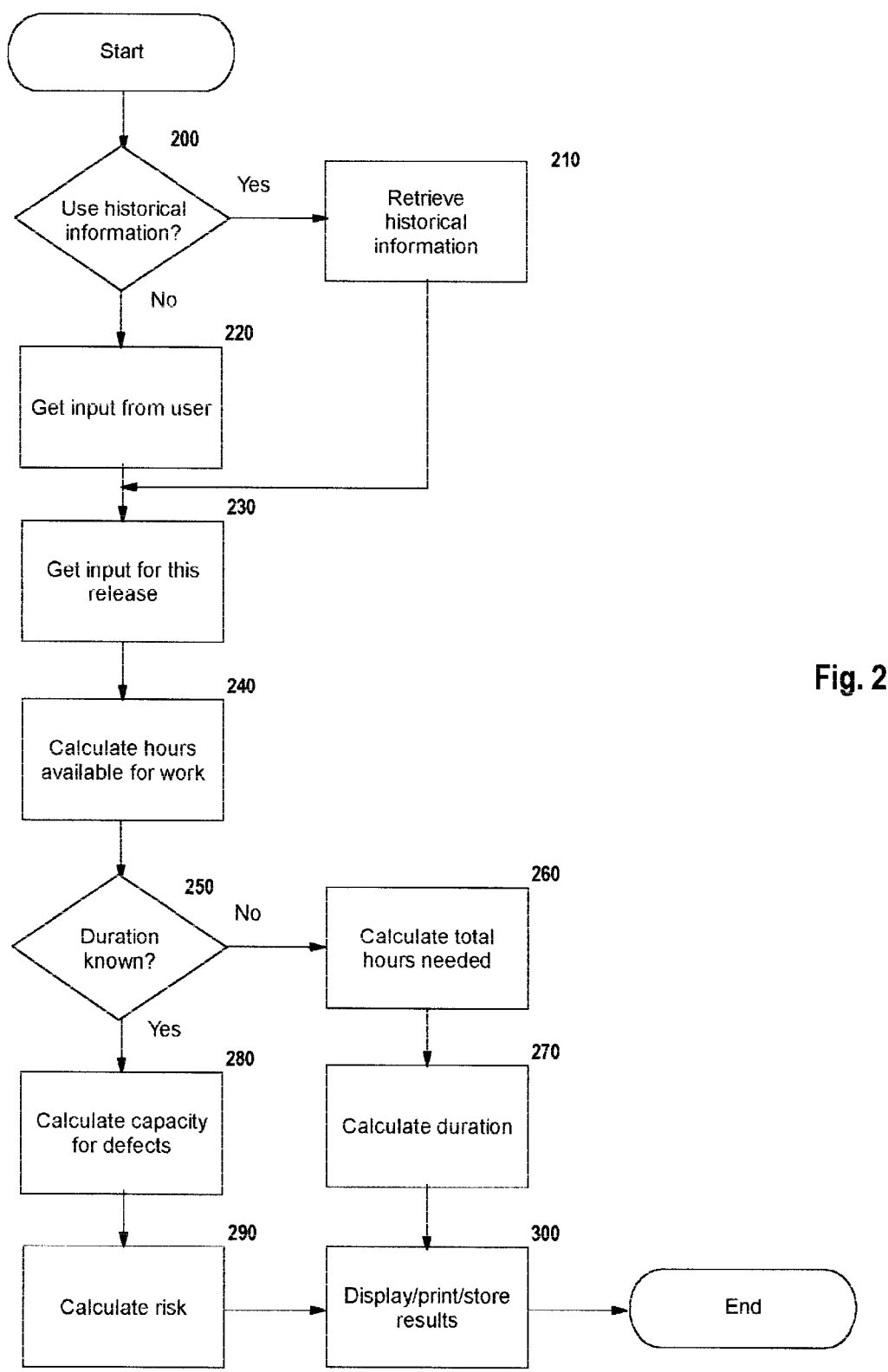
FIG. 2 illustrates a flowchart depicting the logic with which a preferred embodiment of the present invention may be implemented.

According to the preferred embodiment of the present invention, this novel test duration formula (which will be explained in more detail below with reference to FIG. 2) is further defined as:

$$\text{weeks\_of\_duration} = [(\text{hours\_per\_test\_scenario} * \text{nbr\_test\_scenarios}) + (\text{hours\_per\_defect} * \text{nbr\_defects})] / \text{hours\_per\_work\_week} * 10(1-0.9^{\#testers}) * \text{productivity\_factor}$$

Using the technique of the present invention for automated generation of a software test plan results in a more accurate plan as compared to existing techniques. The benefits of generating a more accurate test plan include more accurate estimates of test duration and test cost. With this more accurate information available, more informed business decisions (such as whether some functionality should be dropped from a product, whether a projected shipment date is reasonably achievable, when test personnel will be finished the current project and available for a subsequent project, etc.) can be made early in the product development cycle. In addition, the work of generating the test plan is simpler and much quicker. Furthermore, the assumptions of the generated test plan (such as how many defects are to be documented, how many testers are available, the cumulative percent of test completion expected at a point in time, etc.) can be stated, and these assumptions can then be easily tracked (e.g. by comparing the number of defects detected, and/or test cases executed, to the projections) to determine whether the plan is proceeding on schedule. If it is determined that the assumptions are not being met, the same technique can be used to generate a recovery plan by modifying some input, such as by adding test personnel.

The preferred embodiment for implementing an automated test plan generation technique using the novel model of the present invention will now be discussed with reference to the logic depicted in FIG. 2. The process of generating a test plan begins at Block 200, where a test is made as to whether historical information is to be used for generating the test plan. The preferred embodiment preferably uses historical information from past release(s) of this software project, when such information is available, as an estimate of what can be expected in the current release. If such information is not available (e.g. when this is the first release of the software project), then Block 200 has a negative result, and control transfers to Block 220. Or, even though historical information is available, it may be desirable in some situations to override it. For example, it may be known that the current release is quite different from the prior release, such that the historical information is not expected to be accurate. Block 200 also has a negative result in this situation.

When historical information is to be used, the answer at Block 200 is positive, and the historical information will be retrieved from a stored location at Block 210. This stored location may be predefined and coded into the implementation, or it may be obtained through user input. This historical information preferably comprises the average number of hours spent per test scenario, the average number of hours spent identifying and documenting a problem, and a productivity factor. After the historical information has been retrieved, control transfers to Block 230.

If historical information is not available, or is not to be used, then Block 220 indicates that the user will be prompted to enter estimates for the current release or software project (hereinafter referred to simply as the "current release"). These estimates preferably comprise the average number of hours to be spent per test scenario, the average number of hours to be spent identifying and documenting a problem, and an anticipated productivity factor. Preferably, the productivity factor is computed as the percent of a tester's time spent performing the two primary tasks of the test phase, executing test scenarios and documenting defects (as opposed to time spent in meetings or doing other miscellaneous tasks).

Control reaches Block 230 following completion of Block 210 or Block 220. At Block 230, the user is prompted to enter information for the current release. This information comprises the projected number of test scenarios to be executed, the projected number of defects to be detected, and the number of available test personnel.

Block 240 calculates the number of tester hours available for work (i.e. executing test scenarios and documenting detected defects) per week. To account for the "mythical man-month" phenomenon that as additional test personnel are added, eventually a point of diminishing return is reached, the preferred embodiment of the present invention assumes that each additional tester is 90 percent as productive as the previously-added tester. Thus, the preferred embodiment computes the number of tester hours available per week using the following equation:

$$\text{available\_hours\_per\_week} = \text{hours\_per\_work\_week} * 10(1-0.9^{\#testers}) * \text{productivity\_factor}$$

(While the diminishing return value of 90 percent productivity is used in the preferred embodiment, other values may be appropriate in particular situations and may be substituted in this formula without deviating from the inventive concepts of the present invention.)

Block 250 then tests whether the test duration is known. If not, then control transfers to Block 260 where the total hours of test time needed is calculated. This calculation comprises multiplying the projected number of test scenarios by the anticipated time required per test scenario; multiplying the projected number of defects by the anticipated time required per defect; and adding these together, as shown by the following equation:

$$\text{total\_hours\_needed} = (\text{hours\_per\_test\_scenario} * \text{nbr\_test\_scenarios}) + (\text{hours\_per\_defect} * \text{nbr\_defects})$$

Block 270 calculates the expected test duration, as follows:

$$\text{weeks\_of\_duration} = \text{total\_hours\_needed} / \text{available\_hours\_per\_week}$$

Control then transfers to Block 300.

An additional benefit of the present invention occurs when test duration and/or end date is predetermined, as is often the case in today's competitive software market. This situation correlates to following the "Yes" branch from Block 250, transferring control to Block 280. Using the model of the present invention, the ability to execute the projected number of test cases and/or to detect and document the projected number of defects during the fixed-duration time period can be assessed. It may happen that the allotted time is insufficient for executing the projected test case load, or for detecting the projected number of defects. When this happens, a decision must be made as to whether the test phase should be lengthened. To make this determination, the risk involved with shipping the product when some percentage of the test cases have not been executed or when some percentage of the projected defects remain undetected must be evaluated.

Block 280 calculates a capacity for defects during the fixed-duration test phase, according to the following equation:

$$\text{defect\_capacity} = [\text{weeks\_of\_duration} * \text{available\_hours\_per\_week} - (\text{hours\_per\_test\_scenario} * \text{nbr\_test\_scenarios})] / \text{hours\_per\_defect}$$

In other words, for a test of fixed duration (expressed in weeks), the number of defects that can be detected and documented is determined by computing the totals hours available during the test (i.e. duration*available_hours_per_week); subtracting from this number the hours that will be spent executing tests (yielding the time available for defects); and dividing these hours available for defects by the number of hours required for each defect.

Block 290 then calculates the risk involved in this fixed-duration test, as follows:

risk=nbr_defects−defect_capacity

This computed result represents the number of defects remaining in the code at the completion of the fixed-duration test phase. (Note that this result may occasionally be negative, indicating that more time has been allotted than is likely to be necessary, given the projections.)

Block 300 is reached following the calculations for both situations, when the test duration is fixed and when it is unknown. At Block 300, the computed results will be made available in an appropriate form. This may comprise printing a report, displaying the results on a user interface panel, and/or storing the results in a file or other storage medium. Processing of the preferred embodiment of the present invention is then complete.

As has been demonstrated, the problem of attempting to accurately plan test duration early in the software development cycle can now be solved quickly and simply, using the technique of the present invention. This technique enables quicker, easier-to-calculate, more quantifiable, and more accurate estimates of test duration. The generated test plan may be monitored throughout the test, to determine whether the test is proceeding according to schedule. If not, estimates may be revised to generated an updated plan by re-executing the process of FIG. 2.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

I claim:

1. A computer program product for generating a software test plan, said computer program product residing on a computer-readable medium in a computing system, comprising:

computer-readable program code means for obtaining productivity information for a software project to be tested, said productivity information comprising an average number of hours required for executing a test scenario, an average number of hours required for identifying and documenting a defect, and a productivity factor of test personnel;

computer-readable program code means for obtaining input values for said software project, said input values comprising a projected number of said test scenarios, a projected number of said defects, and a projected number of said test personnel;

computer-readable program code means for computing a number of weekly hours available for work; and computer-readable program code means for generating said software test plan using said obtained productivity information and said obtained input values, further comprising:

computer-readable program code means for computing a duration of said testing of said software project when said duration is not known; and computer-readable program code means for computing a risk factor for said testing when said duration is known.

2. The computer program product for generating a software test plan according to claim 1, wherein said computer-readable program code means for computing a number of weekly hours available for work further comprises:

computer-readable program code means for computing a number of hours available per week per tester by multiplying a number of hours per work week by said productivity factor;

computer-readable program code means for computing a diminishing return value by multiplying 10 by a result of subtracting $Y^x$ from 1.0, where Y is a diminishing return productivity factor and x is said projected number of test personnel; and computer-readable program code means for setting said number of weekly hours available for work to a product of said computed number of hours available per week multiplied by said computed diminishing return value.

3. The computer program product for generating a software test plan according to claim 1 or claim 2, wherein said computer-readable program code means for computing a duration further comprises:

computer-readable program code means for computing a total of hours needed for test scenario execution by multiplying said average number of hours required for executing a test scenario by said projected number of said test scenarios;

computer-readable program code means for computing a total of hours needed for defect identification and documentation by multiplying said average number of hours required for identifying and documenting a defect by said projected number of said defects;

computer-readable program code means for computing a total hours needed by adding said computed total of hours needed for test scenario execution and said total of hours needed for defect identification and documentation; and computer-readable program code means for computing said duration in weeks by dividing said computed total hours needed by said number of weekly hours available for work.

4. The computer program product for generating a software test plan according to claim 1 or claim 2, wherein said computer-readable program code means for computing a risk factor further comprises:

computer-readable program code means for computing a capacity for defects, further comprising:

computer-readable program code means for computing a first product by multiplying said known duration by said number of weekly hours available for work;

computer-readable program code means for computing a second product by multiplying said average number of hours required for executing a test scenario by said projected number of said test scenarios;

computer-readable program code means for computing a time available for defects by subtracting said second product from said first product; and computer-readable program code means for setting said capacity for defects to said computed time available for defects divided by said average number of hours required for identifying and documenting a defect; and computer-readable program code means for computing a risk, further comprising:

computer-readable program code means for subtracting said capacity for defects from said projected number of said defects; and computer-readable program code means for setting said risk factor to said computed risk.

5. The computer program product for generating a software test plan according to claim 2, wherein said diminishing return productivity factor is 0.9.

6. A system for generating a software test plan, comprising:

means for obtaining productivity information for a software project to be tested, said productivity information comprising an average number of hours required for executing a test scenario, an average number of hours required for identifying and documenting a defect, and a productivity factor of test personnel;

means for obtaining input values for said software project, said input values comprising a projected number of said test scenarios, a projected number of said defects, and a projected number of said test personnel;

means for computing a number of weekly hours available for work; and means for generating said software test plan using said obtained productivity information and said obtained input values, further comprising:

means for computing a duration of said testing of said software project when said duration is not known; and means for computing a risk factor for said testing when said duration is known.

7. The system for generating a software test plan according to claim 6, wherein said means for computing a number of weekly hours available for work further comprises:

means for computing a number of hours available per week per tester by multiplying a number of hours per work week by said productivity factor;

means for computing a diminishing return value by multiplying 10 by a result of subtracting $Y^x$ from 1.0, where Y is a diminishing return productivity factor and x is said projected number of test personnel; and means for setting said number of weekly hours available for work to a product of said computed number of hours available per week multiplied by said computed diminishing return value.

8. The system for generating a software test plan according to claim 6 or claim 7, wherein said means for computing a duration further comprises:

means for computing a total of hours needed for test scenario execution by multiplying said average number of hours required for executing a test scenario by said projected number of said test scenarios;

means for computing a total of hours needed for defect identification and documentation by multiplying said average number of hours required for identifying and documenting a defect by said projected number of said defects;

means for computing a total hours needed by adding said computed total of hours needed for test scenario execution and said total of hours needed for defect identification and documentation; and means for computing said duration in weeks by dividing said computed total hours needed by said number of weekly hours available for work.

9. The system for generating a software test plan according to claim 6 or claim 7, wherein said means for computing a risk factor further comprises:

means for computing a capacity for defects, further comprising:

means for computing a first product by multiplying said known duration by said number of weekly hours available for work;

means for computing a second product by multiplying said average number of hours required for executing a test scenario by said projected number of said test scenarios;

means for computing a time available for defects by subtracting said second product from said first product; and means for setting said capacity for defects to said computed time available for defects divided by said average number of hours required for identifying and documenting a defect; and means for computing a risk, further comprising:

means for subtracting said capacity for defects from said projected number of said defects; and means for setting said risk factor to said computed risk.

10. The system for generating a software test plan according to claim 7, wherein said diminishing return productivity factor is 0.9.

11. A method for generating a software test plan, comprising the steps of:

obtaining productivity information for a software project to be tested, said productivity information comprising an average number of hours required for executing a test scenario, an average number of hours required for identifying and documenting a defect, and a productivity factor of test personnel;

obtaining input values for said software project, said input values comprising a projected number of said test scenarios, a projected number of said defects, and a projected number of said test personnel;

computing a number of weekly hours available for work; and generating said software test plan using said obtained productivity information and said obtained input values, further comprising the steps of:

computing a duration of said testing of said software project when said duration is not known; and computing a risk factor for said testing when said duration is known.

12. The method for generating a software test plan according to claim 11, wherein said step of computing a number of weekly hours available for work further comprises the steps of:

computing a number of hours available per week per tester by multiplying a number of hours per work week by said productivity factor;

computing a diminishing return value by multiplying 10 by a result of subtracting $Y^x$ from 1.0, where Y is a diminishing return productivity factor and x is said projected number of test personnel; and setting said number of weekly hours available for work to a product of said computed number of hours available per week multiplied by said computed diminishing return value.

13. The method for generating a software test plan according to claim 11 or claim 12, wherein said step of computing a duration further comprises the steps of:

computing a total of hours needed for test scenario execution by multiplying said average number of hours required for executing a test scenario by said projected number of said test scenarios;

computing a total of hours needed for defect identification and documentation by multiplying said average number of hours required for identifying and documenting a defect by said projected number of said defects;

computing a total hours needed by adding said computed total of hours needed for test scenario execution and said total of hours needed for defect identification and documentation; and computing said duration in weeks by dividing said computed total hours needed by said number of weekly hours available for work.

14. The method for generating a software test plan according to claim 11 or claim 12, wherein said step of computing a risk factor further comprises the steps of:

computing a capacity for defects, further comprising the steps of:

computing a first product by multiplying said known duration by said number of weekly hours available for work;

computing a second product by multiplying said average number of hours required for executing a test scenario by said projected number of said test scenarios;

computing a time available for defects by subtracting said second product from said first product; and setting said capacity for defects to said computed time available for defects divided by said average number of hours required for identifying and documenting a defect; and computing a risk, further comprising the steps of:

subtracting said capacity for defects from said projected number of said defects; and setting said risk factor to said computed risk.

15. The method for generating a software test plan according to claim 12, wherein said diminishing return productivity factor is 0.9.

* * * * *